United States Patent [19]

Lennox et al.

[11] Patent Number: 5,200,370
[45] Date of Patent: Apr. 6, 1993

[54] MONOCRYSTALLINE CERAMIC FIBERS AND METHOD OF PREPARING SAME

[75] Inventors: James R. Lennox; Roger T. Pepper, both of Saco; Paul V. Chayka, Gorham, all of Me.

[73] Assignee: Fiber Materials, Inc., Biddeford, Me.

[21] Appl. No.: 615,025

[22] Filed: Nov. 16, 1990

[51] Int. Cl.⁵ ............. C04B 35/02; H01B 12/00; C30B 13/00

[52] U.S. Cl. ............. 501/95; 156/616.1; 156/616.2; 156/DIG. 112; 427/62; 427/126.2; 427/126.5; 427/255; 505/704; 505/740; 505/1

[58] Field of Search ............. 501/95; 65/3.1, 60, 65/52, 32, 3, 4; 156/616.1, 616.2, DIG. 61, DIG. 69, DIG. 112; 423/327; 505/704, 1, 740; 427/62, 126.2, 126.5, 249, 255

[56] References Cited

U.S. PATENT DOCUMENTS

| | | | |
|---|---|---|---|
| 3,242,015 | 3/1966 | Harris | 156/616.2 |
| 3,335,038 | 8/1967 | Doo | 156/616.1 |
| 3,607,025 | 9/1971 | Jacobson | 156/624 |
| 4,040,890 | 8/1977 | Burrus, Jr. et al. | 156/605 |
| 4,430,150 | 2/1984 | Levine et al. | 156/616.2 |
| 4,487,651 | 12/1984 | Wang | 156/616 |
| 4,722,763 | 2/1985 | Pa et al. | 156/616.1 |
| 4,806,198 | 2/1989 | Jogota et al. | 156/DIG. 112 |
| 4,902,376 | 2/1990 | Chen et al. | 156/616.2 |
| 4,921,822 | 5/1990 | Luthra | 501/95 |
| 4,929,328 | 5/1990 | Besmann et al. | 427/255 |
| 4,999,082 | 3/1991 | Kremer et al. | 156/616.1 |
| 5,011,823 | 4/1991 | Jin et al. | 427/62 |
| 5,037,800 | 8/1991 | Iijima et al. | 505/740 |

Primary Examiner—William R. Dixon, Jr.
Assistant Examiner—Susan Hollenbeck
Attorney, Agent, or Firm—Schiller & Kusmer

[57] ABSTRACT

Monocrystalline ceramic fibers are disclosed together with a process for preparing such fibers. Polycrystalline ceramic fibers in a tow are coated with a coating that is chemically substantially non-reactive with the ceramic (e.g. alumina fibers coated with molybdenum), and the coated fibers are drawn through a heating zone maintained at a temperature high enough to melt the fibers without melting the coating. The coated fibers are withdrawn from the heating zone and cooled rapidly enough to form a substantially monocrystalline ceramic. The protective coating may thereafter be removed to leave a tow of substantially single-crystal ceramic fibers. Monocrystalline ceramic fibers about 8–20 microns in diameter are prepared by the disclosed process.

25 Claims, 1 Drawing Sheet

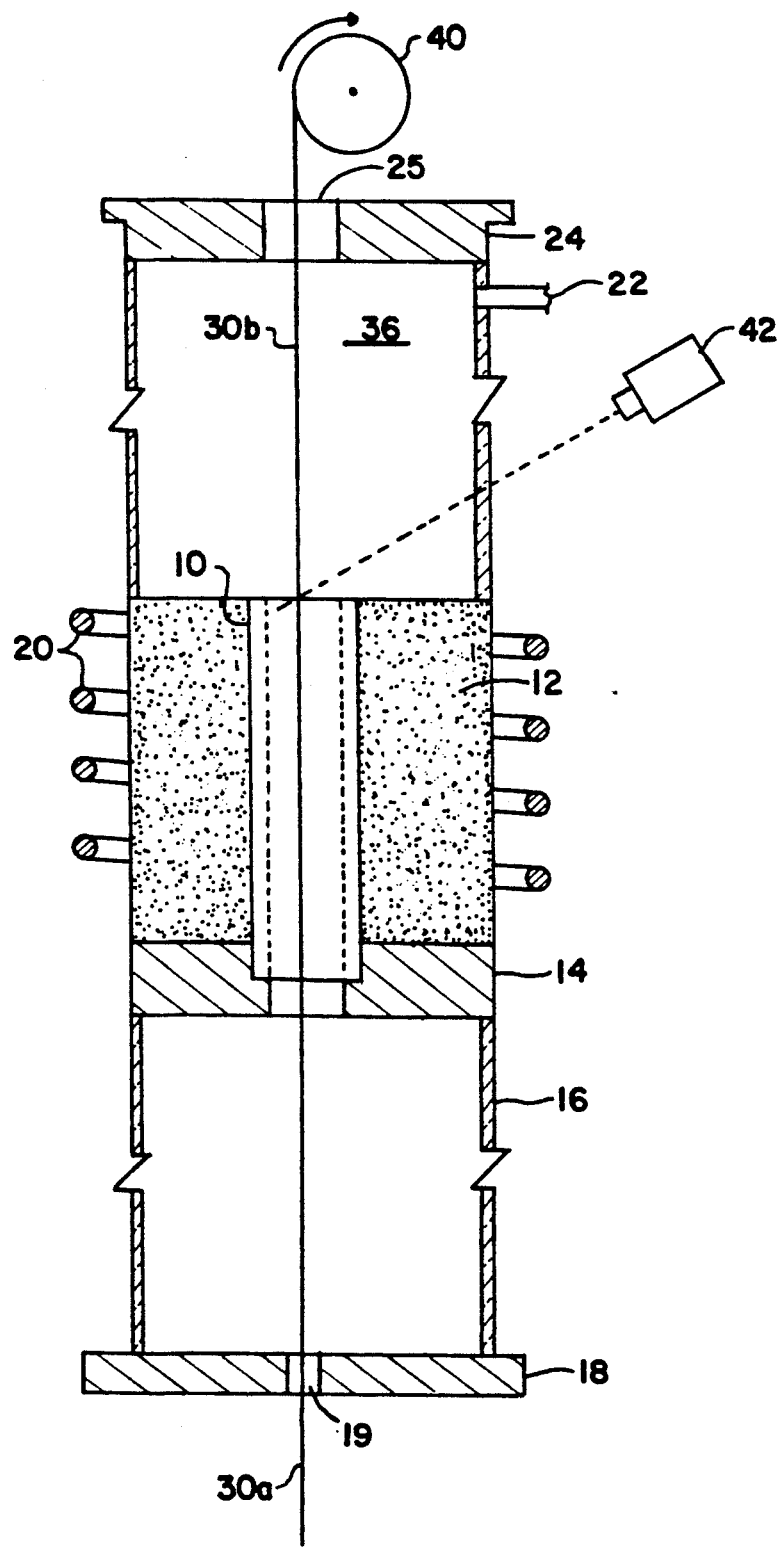

MONOCRYSTALLINE CERAMIC FIBERS AND METHOD OF PREPARING SAME

The present invention relates to ceramic fibers and more specifically to high strength ceramic fibers characterized in being substantially monocrystalline and having very small diameters.

Ceramic matrix composite materials in which oriented polycrystalline fibers are dispersed as reinforcements throughout a ceramic matrix are known in the art. These materials have a wide and growing range of high-performance, high-temperature industrial applications, such as in aircraft and spacecraft, because of their strength and reliability, particularly at temperatures over about 3000° F. For example, polycrystalline alumina fibers are intended for use as reinforcements in such composites because they are relatively inexpensive, impart high tensile strength to the finished products, and remain chemically stable at very high temperatures.

In a typical procedure, such composites are formed from a fiber "tow" (which term, as used herein, is intended to include ropes, yarns and other multifiber or multifilament elongated arrays or bundles) comprising a generally loose, substantially parallel array of ceramic fibers having substantial interstitial spaces which are then impregnated with matrix material. The properties of the reinforced composite are, inter alia, a function of the fiber diameters and the degree of crystallization and crystal orientation within the fibers. Of particular importance is the property of "creep" resistance, the ability of the finished composite to resist deformation along at least one axis over long time periods while being maintained at very high temperatures.

Smaller diameter fibers exhibit superior tensile strength compared to larger diameter fiber, because such smaller diameter fibers typically have a higher degree of crystallization and crystal orientation, and contain fewer impurities and crystal imperfections than larger diameter fibers. Further, smaller diameter fibers generally have greater flexibility than larger diameter fibers, so it is easier to weave such fibers into fabric or three-dimensional shapes prior to impregnating the latter with the matrix material or matrix precursor.

In general, small diameter, highly-oriented, monocrystalline fibers should be more effective for composite reinforcement, because they exhibit much greater tensile strength along the crystal axis than polycrystalline fibers. Particularly, monocrystalline alumina (sapphire) fiber exhibits less creep at highly elevated temperatures than polycrystalline alumina fibers.

However, substantially monocrystalline ceramic fibers produced by prior art processes typically have relatively large diameters, i.e., of 50 microns or more, and the prior art processes for manufacturing such fibers are relatively slow and expensive. For example, U.S. Pat. No. 3,953,174 to LaBelle describes an improved version of the "EFG" (edge-defined, film-fed, growth) process in which continuous sapphire fibers are drawn from a crucible of molten alumina. The cross-section dimensions of the fibers are defined by the size of an opening in a floating die on the surface of the melt. It is believed that the smallest diameter fibers produced according to the EFG process are about 50 microns in diameter, the maximum draw speed is about 1.5 in./min., and about 25 250 micron diameter fibers have been simultaneously drawn. A more recent description of the EFG process can be found in H. E. LaBelle, Jr., "EFG - The Invention and Application to Sapphire Growth," in *Journal of Crystal Growth*, Vol. 50 (September 1980) at pp. 8–17.

Another prior art process for producing single-crystal continuous alumina fibers is the "LFZ" (laser floating zone) process developed by the NASA-Lewis Researach Center and described in the publications by J. S. Haggerty and W. P. Menashi (A. D. Little Inc.), "Production of Oxide Fibers by a Floating Zone Fiber Drawing Technique," NASA CR-72811, ADL 71997 (1971) and L. J. Westfall, "Advanced Fiber Development for Intermetallic Matrix Composites," NASA CP 10039, Proceedings of the 2nd Annual HITEMP Review, Cleveland, Ohio (Oct. 31–Nov. 2, 1989). Essentially, in the LFZ process a molten zone is formed on the tip of a polycrystalline alumina rod with a laser beam, a seed crystal is lowered into the molten zone, and the seed crystal is drawn from the molten zone to form a single-crystal fiber. Fiber draw and rod feed speeds must be carefully controlled to form a uniform fiber. It appears that the smallest diameter fibers produced according to the LFZ process are about 75 microns in diameter, and the maximum draw speed achieved with the LFZ process is about 0.5 in./min.

In contrast to the prior art processes, the process of the present invention can produce substantially monocrystalline continuous ceramic fibers ranging from about 8–20 microns in diameter at speeds up to 24 in./min. or greater. Several tows each containing as many as 200 filaments or more, can be processed simultaneously in accordance with the present invention, resulting in both a superior product and far greater economies than can be realized with the prior art processes.

Accordingly, a principal object of this invention is to provide single-crystal ceramic fibers of about 20 microns in diameter or smaller.

Other objects of this invention are to provide a process for making bundles of single-crystal ceramic fibers at speeds in excess of about 2 in./min.; to provide a bundle of very small diameter, single-crystal ceramic filaments for reinforcing high temperature ceramic matrix composite materials; and to provide a process for rapidly and relatively inexpensively converting polycrystalline ceramic fibers to substantially single-crystal fibers.

A further object of this invention is to provide a process for treating a bundle of polycrystalline ceramic fibers containing as many as 1000 filaments, 8 to 20 microns in diameter, at speeds of at least 24 in./min., to produce a bundle of small-diameter, substantially single-crystal fibers.

Other objects of the present invention will in part be obvious and will in part appear hereinafter. The invention accordingly comprises the several steps and the relation and order of one or more of such steps with respect to each of the others, and the product possessing the features, properties and relation of elements, all of which are exemplified in the following detailed disclosure and the scope of the application of which will be indicated in the claims.

For a fuller understanding of the nature and objects of the present invention, reference should be had to the following detailed description taken in connection with the accompanying drawing wherein there is shown a schematic sectional view of the interior of a zone melt furnace used to convert polycrystalline ceramic fiber to substantially monocrystalline ceramic fiber in accordance with this invention.

The process of the present invention generally is concerned with the conversion of a variety of different ceramic fibers from polycrystalline to substantially monocrystalline form. The process involves the formation of a coating around a precursor polycrystalline fiber, the coating being formed of a refractory material having a melting point higher than that of the polycrystalline fiber, the refractory material also being substantially chemically non-reactive with the fiber. The coated fiber is heated to a temperature above the melting point of the ceramic, but below the melting point of the refractory coating, for a time sufficient to melt the ceramic. The melted ceramic is then cooled at a rate sufficient to crystallize the ceramic in a substantially monocrystalline form. Preferably, the process also includes a step of removing the coating from the resulting substantially monocrystalline fiber.

Generally, ceramic reinforcing materials that exhibit high melting points, typified by the substantially pure oxides, aluminates, zirconates, titanates, silicates, carbides, nitrides and borides, of such elements as magnesium, aluminum, titanium, zirconium, barium, strontium, calcium, chromium, nickel, cobalt, beryllium, uranium and a number of the rare earth metals, as the case may be, are useful as precursor polycrystalline ceramic reinforcing fibers in the process of the present invention. For example, polycrystalline fibers made of mullite ($3Al_2O_3.2SiO_2$) can be treated according to this invention and subsequently used in a matrix composite as a high-temperature ceramic reinforcing fiber. Polycrystalline fiber formed of a-alumina is often preferred as a precursor material because it is inexpensive and is readily available commercially, particularly in the form of very small diameter fibers. For example, "Fiber-FP", a brand of silica-coated (0.2-0.25% - 50 A), alumina fibers made by E. I. DuPont de Nemours Co., are commercially microns in diameter. "Almax" fibers, made by Mitsui Mining Co. are 99.5%-pure, polycrystalline a-alumina fibers approximately 8 to 10 microns in diameter.

Yet other, more exotic, polycrystalline ceramic fibers useful as precursor materials in the process of the present invention include superconducting compounds such as known variations of the yttrium-barium-copper-oxygen compounds, and yttrium aluminum garnet ($Y_3Al_5O_{12}$). Monocrystals of yttrium aluminum garnet show a "creep" strength an order of magnitude higher than that of sapphire. Also, whereas sapphire crystals show high strength only along the C-axis of the crystals, monocrystals of yttrium aluminum garnet also have relatively high off-axis strength. The selection of ceramic fibers for use in this invention is limited only by the availability of a suitable, compatible coating material.

The process of the present invention can be used with single polycrystalline fibers as well as one or more tows of such fibers comprising as many as 200 or more individual filaments. Although this invention has special utility for preparing very small diameter, single-crystal fibers on the order of about 8-20 microns in diameter, this invention is applicable to polycrystalline fibers of larger and smaller diameters.

A wide variety of refractory coatings are suitable for application to any selected polycrystalline precursor fiber, provided that the coating meets certain requirements. The refractory coating should be substantially chemically non-reactive with the ceramic fiber, and necessarily, the melting point of the coating must be higher than that of that ceramic fiber. For example, alumina fibers may be coated with high-melting point metals (e.g., iridium, tantalum, osmium, molybdenum, tungsten, and rhenium); with carbides (e.g., molybdenum carbide, tungsten carbide, tantalum carbide, and the like); and with borides (e.g., titanium diboride and zirconium diboride). The choice of a coating material, within the constraints described above, will depend on cost, availability, and ease of handling.

Any conventional coating process can be used for coating the polycrystalline fiber precursor of this invention. The coating need not be perfectly uniform along the length of the fiber, but it must have sufficient integrity and thickness to provide support for the molten fiber during the heating and cooling steps and should be continuous enough to avoid having too many gaps through which interfilament sintering might occur where a bundle of fibers is being processed simultaneously. Preferred thickness ranges for the coatings are typically 0.05-2.5 microns for a 10 micron diameter fiber up to 5-25 microns for a 100 micron diameter fiber. The preferred coating thickness should generally not exceed 25% of the fiber diameter, although for some purposes, thicker coatings may be acceptable.

A preferred process for coating the fiber precursors of this invention is by chemical vapor deposition such as is described in U.S. Pat. No. 3,860,443. Another useful coating method is to deposit a metal compound (e.g., a metal nitrate) on the fiber followed by thermal decomposition of the compound to leave the metal as the coating. Subsequent sintering of the coating may then be required to form the desired pore-free coating. Sputtering techniques for coating deposition may also be feasible in some instances.

As noted, the present process requires that the coated polycrystalline ceramic fiber be heated to a temperature above the melting point of the fiber but below the melting point of the coating. In general, the temperature range of the melting process extends from the solidus point of the ceramic fiber to a temperature 500° C. above the liquidus point of the fiber. Thus, for example, the useful temperature range for alumina is about 2049-2550° C. The coated ceramic fiber must be maintained at a temperature above the fiber melting point only long enough to insure complete melting of the polycrystalline ceramic fiber. Although the melting step of the present invention can be accomplished using any conventional heating process, in a preferred embodiment of the invention the coated ceramic fiber is drawn through a zone heating furnace, such as a resistively heated one, in a continuous or semi-batch process. An induction furnace as illustrated in the drawing can also typically be employed in carrying out this procedure.

The furnace shown in the drawing includes hollow graphite susceptor 10 insulated with jacket 12 of carbon black, both being supported on graphite or carbon composite support ring 14 housed inside vertical fused quartz reaction tube 16. As means for heating graphite susceptor 10, that portion of quartz tube 16 containing the susceptor is surrounded by power source coil 20, such as a 10 KW RF coil. The bottom of tube 16 is fitted with aluminum end cap 18 provided with aperture 19 through which unprocessed coated polycrystalline fiber 30a may be introduced into the furnace. In addition, argon or another non-combustible inert gas that is chemically non-reactive with respect to the coating material on fiber 30 is fed continuously into the interior of the furnace through gas inlet 22 in order to maintain a chemically non-reactive environment within the furnace.

The top of tube 16 is fitted with graphite or carbon composite end cap 24 provided with aperture 25 through which processed coated fiber 30b may exit the furnace. Variable speed fiber drive system 40 mounted above tube 16 is capable of drawing fiber 30 through the furnace at speeds ranging from about 0.10-24 in./min. Optical pyrometer 42, aimed through quartz tube 16 onto the inside edge of susceptor 10, may be provided for continuously monitoring the susceptor temperature. The temperature inside susceptor 10 can be raised or lowered, as necessary, by regulating the power through coil 20, and automatic controls (not shown), preset to the desired temperature range can be provided if desired.

As previously noted, it is only necessary to bring coated fiber 30 above the melting point of the ceramic fiber long enough to insure complete melting. Accordingly, the speed at which the coated fiber is drawn through the furnace, the vertical dimension (length) of susceptor 10, and the temperature maintained inside susceptor 10 are interdependent variables that may, within broad limits, be adjusted as necessary or desired. For example, in order to accommodate a desired fiber draw speed, it might be necessary to use a longer susceptor 10 or maintain a higher susceptor temperature, or both, to insure that the coated fiber is heated above its melting point for an appropriate time interval before it exits the susceptor. Adjustment of these variables to meet particular production requirements is a matter of routine experimentation.

Upon leaving susceptor 10, the processed coated fiber 30b enters cooling zone 36, typically beginning inside tube 16 at a point where relatively cool argon or other inert gas is injected into the furnace. Crystal growth occurs when the molten ceramic material inside the refractory coating cools below its melting point. The cooling and crystal growth process can continue and even accelerate as fiber 30b is withdrawn from tube 16 through aperture 25 and experiences air-quenching. In order to further accelerate the cooling and crystal growth step, additional cooling or refrigeration means may be provided.

It may be desirable to remove the refractory coating after the monocrystalline fiber is formed. For example, where the coating is a metal, it can readily be removed by etching with a suitable chemical bath that should be selected so as to not substantially react chemically with the ceramic monocrystalline fiber. For example, a molybdenum coating can be easily etched using a nitric acid solution. Selection of a suitable bath will, of course, depend on the natures of the coating and the ceramic fiber. Other techniques, such as abrasion and the like, for removing the coating may be suitable for some applications. It is also contemplated that for some monocrystalline fiber applications it may not be necessary to remove the coating at all. Retention of the coating is desirable, for example, in instances where the coating serves as an interface barrier to prevent reaction between the composite matrix and alumina core filaments. The metal coating may also serve as an electrical conductor for electrical cable purposes, and indeed as the matrix itself when coated fibers are compacted and sintered into a unit under appropriate conditions of temperature and pressure. Accordingly, it is understood that the coating removal step is optional and does not affect the conversion of polycrystalline ceramic fiber to monocrystalline form as described herein.

While the foregoing description of the zone melt furnace of the drawing referred to processing a single coated polycrystalline fiber 30, it is understood that the same general process could be applied to treating one or more tows each formed of up to as many as 200 or more individual coated polycrystalline fibers. Although it is within the scope of this invention to process tows of polycrystalline fibers comprising fibers of different sizes or ceramic compositions, in practice the bundle will normally be comprised of more or less uniformly-sized filaments of the same ceramic composition.

The single-crystal ceramic fibers prepared in accordance with this invention are expected to impart superior "creep" resistance to composite matrix components reinforced with these fibers, i.e., the reinforced composites should be resistant to deformation over long time periods at elevated temperatures. Polycrystalline ceramic fibers, when used in such applications, tend to deform by grain boundary sliding and by some diffusion of cations in the material. Because substantially monocrystalline ceramic fibers prepared according to this invention contain fewer grain boundaries, substantially only limited deformation of these fibers in a composite matrix should occur through cation diffusion This should result in a higher degree of composite "creep" resistance, especially for extreme applications such as in combustion engine parts and turbines for supersonic aircraft where operating temperatures may reach 3200° F. The formation of a composite by impregnation of a body of fibers with a matrix material is well known in the art and need not be further described here.

The use of very small monocrystalline ceramic fibers of less than about 20 microns in diameter is preferred because it is easier to weave such fibers into a cloth for various applications. Small-diameter fibers are also preferred because small fibers present relatively short heat conduction paths and, therefore, permit faster freezing speeds after removal from the furnace in order to establish substantial monocrystallinity. Further, small diameter fibers usually have fewer imperfections and discontinuities and better monocrystallinity, so are expected to more closely approach the theoretical tensile strength of the material. It is believed that the monocrystalline ceramic fibers of the present invention having average diameters of less than about 25 microns were not known to exist prior to this invention.

While the following examples will aid in illustrating various aspects of this invention, they should not be construed as restrictive or limiting as to materials, process variables, or any other features of this invention but rather are presented merely as representative embodiments.

EXAMPLE 1

Polycrystalline, high purity alumina filaments in a tow of about 210 filaments each about 20 microns in diameter, were coated with a refractory coating of molybdenum by chemical vapor deposition according to the following procedure:

Commercially available, high purity (99.985%) molybdenum metal wire was converted to molybdenum chloride vapor by reaction with chlorine gas in a chemical vapor deposition chamber at a temperature of above 850° C., and the tow of alumina filaments, placed in the chamber, was thoroughly infiltrated with the vapor.

The molybdenum chloride vapor was then reduced to elemental molybdenum by a stream of hydrogen gas injected into the chamber adjacent the alumina fiber tow, depositing a coating of the metal onto the filaments. The coating process was continued until the desired thickness was achieved. Exposure times of five to thirty minutes are typically nominally required to obtain coating thicknesses of 0.1 to about 5 microns.

EXAMPLE 2

A quartz reaction tube induction furnace as shown in the drawing was purged with argon. The graphite susceptor was heated to approximately 2100° C., just above the melting point of alumina (2045° C.). A single filament of a tow of "Fiber -FP", hereinbefore identified, was coated with molybdenum by chemical vapor deposition as described in Example 1. The coated fiber was then drawn through the heated susceptor in the quartz reaction tube at a rate of 4 in./min. After cooling, the processed fiber was etched in a 1N nitric acid solution to remove the molybdenum coating. Cross-sections of the treated fiber were then examined using a scanning electron microscope, revealing that a single-crystal structure, 20 microns in diameter in the fiber cross-sections, has been formed.

EXAMPLE 3

A bundle or tow of about 1000 molybdenum-coated a-alumina fibers was treated in an induction furnace as described in Example 2, being drawn through the susceptor at a speed of 24 in./min. After cooling, the processed fibers were etched in a nitric acid solution. Scanning electron microscopy of cross-sections of the treated fiber bundle showed a substantially single-crystal structure in each of the fiber cross-sections comprising the bundle. Some interfilament sintering occurred, but most filaments had been isolated by the molybdenum coatings.

EXAMPLE 4

Ten tows of "Fiber-FP", molybdenum coated as described in Example 1 were treated in an induction furnace as described in Example 3, being drawn through the susceptor at a speed of 4 in./min. After cooling, the processed fibers were etched in a nitric acid solution. As in Example 3, scanning electron microscopy of cross-sections of the treated fiber bundles showed a substantially single-crystal structure for the individual fibers comprising the bundles, with very little interfilament sintering.

Since certain changes may be made in the above processes and products without departing from the scope of the invention herein involved, it is intended that all matter contained in the above description or shown in the accompanying drawing shall be interpreted in an illustrative and not in a limiting sense.

What is claimed is:

1. Process for preparing a substantially monocrystalline ceramic fiber, said process comprising the steps of:
    forming a continuous coating on a fiber of polycrystalline ceramic, said coating being substantially chemically non-reactive with said fiber and comprising a refractory material having a melting point higher than that of said polycrystalline fiber;
    heating the coated fiber in a zone to a temperature above the melting point of said ceramic, but below the melting point of said coating, so as to melt said ceramic; and,
    cooling said melted ceramic at a rate sufficient to crystallize said ceramic in said substantially monocrystalline form.

2. The process as defined in claim 1 further including the step of removing said coating from said fiber after crystallization of the fiber into substantially monocrystalline form.

3. The process as defined in claim 1 wherein said fiber is less than about 25 microns in diameter.

4. The process as defined in claim 1 wherein said ceramic is a substantially pure oxide, aluminate, zirconate, titanate, silicate, carbide, nitride or boride, of magnesium, aluminum, titanium, zirconium, barium, strontium, calcium, chromium, nickel, cobalt, beryllium, uranium and rare earth metals, or mixtures thereof.

5. The process as defined in claim 1 wherein said ceramic is alumina.

6. The process as defined in claim 1 wherein said ceramic is mullite.

7. The process as defined in claim 1 wherein said ceramic is zirconia.

8. The process as defined in claim 1 wherein said ceramic is yttrium aluminum garnet.

9. The process as defined in claim 1 wherein said ceramic is a superconductive ceramic.

10. The process as defined in claim 9 wherein said ceramic is an yttrium-barium-copper-oxygen compound.

11. The process as defined in claim 1 wherein said ceramic fiber is about 8 to 20 microns in diameter.

12. The process as defined in claim 1 wherein said coating is a metal, metal carbide or metal boride.

13. The process as defined in claim 1 wherein said coating comprises molybdenum, iridium, tantalum, osmium or rhenium.

14. The process as defined in claim 1 wherein said coating comprises a diboride of titanium or zirconium.

15. The process as defined in claim 1 wherein said coating comprises a carbide of tungsten or tantalum.

16. The process as defined in claim 1 wherein said coating is formed on said fiber by vapor deposition.

17. The process as defined in claim 1 wherein said heating step is carried out in an induction furnace.

18. The process as defined in claim 1 wherein said heating step is carried out in a resistively heated furnace.

19. The process as defined in claim 17 including the step of providing a chemically inert atmosphere within said furnace during at least the heating of said coated fiber.

20. The process of claim 19 wherein said inert atmosphere is argon.

21. The process as defined in claim 1 wherein said coated fiber is drawn continuously through a heating zone at a speed such that said ceramic fiber is melted before exiting said heating zone.

22. The process of claim 1 wherein said coated fiber is drawn through said zone at a rate of about 2-24 inches per minute.

23. Substantially monocrystalline ceramic fiber prepared by the process of:
    forming a continuous coating on a fiber of polycrystalline ceramic, said coating being substantially chemically non-reactive with said fiber and comprising a refractory material having a melting point higher than that of said polycrystalline fiber;
    heating the coated fiber in a zone to a temperature above the melting point of said ceramic, but below the melting point of said coating, so as to melt said ceramic; and, cooling said melted ceramic at a rate sufficient to crystallize said ceramic in said substantially monocrystalline form.

24. The fiber as defined in claim 23 wherein said polycrystalline ceramic fiber comprises alumina, mullite, zirconia, yttrium aluminum garnet or an yttrium-barium-copper-oxygen compound.

25. The fiber of claim 24 wherein said fiber is less than about 25 microns in average diameter.

* * * * *

UNITED STATES PATENT AND TRADEMARK OFFICE
CERTIFICATE OF CORRECTION

PATENT NO. : 5,200,370

DATED : April 6, 1993

INVENTOR(S) : James R. Lennox, Paul V. Chayka and Roger T. Pepper

It is certified that error appears in the above-identified patent and that said Letters Patent is hereby corrected as shown below:

Claim 1, column 7, line 60, after "a" (first occurrence) delete
-- continuous -- and after "a" (second occurrence) insert -- continuous --;

Claim 23, column 8, line 62, after "a" (first occurrence) delete
-- continuous -- and after "a" (second occurrence) insert -- continuous --.

Signed and Sealed this

Thirtieth Day of November, 1993

*Attest:*

BRUCE LEHMAN

*Attesting Officer*    *Commissioner of Patents and Trademarks*